3 Sheets—Sheet 1.

S. T. ADAMS.
WHEEL-PLOW.

No. 174,343. Patented March 7, 1876

WITNESSES
Robert Everett
George W. Larner

INVENTOR.
Samuel T. Adams.
Gilmore, Smith & Co.
ATTORNEYS

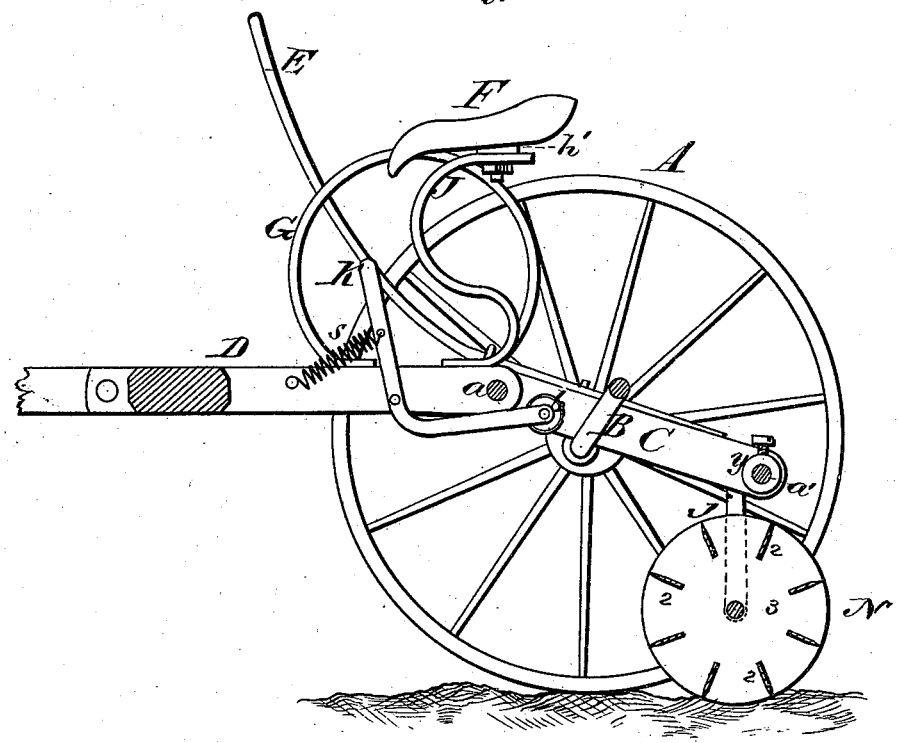

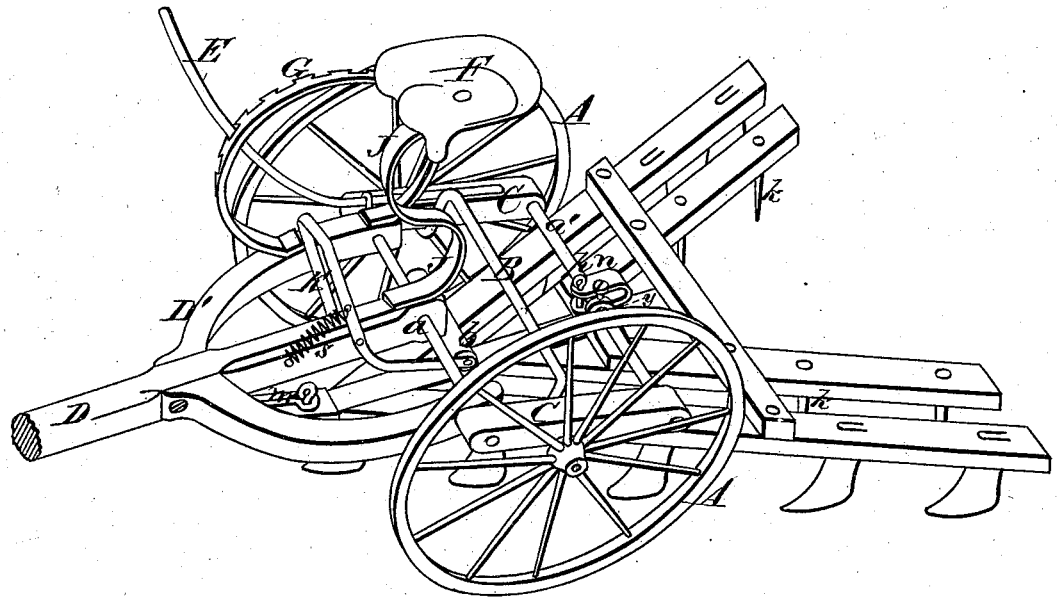

UNITED STATES PATENT OFFICE.

SAMUEL T. ADAMS, OF MEDINA, OHIO.

IMPROVEMENT IN WHEEL-PLOWS.

Specification forming part of Letters Patent No. 174,343, dated March 7, 1876; application filed February 23, 1876.

*To all whom it may concern:*

Be it known that I, SAMUEL T. ADAMS, of Medina, in the county of Medina and State of Ohio, have invented a new and valuable Improvement in Agricultural Implements; and I do hereby declare that the following is a full, clear, and exact description of the construction and operation of the same, reference being had to the annexed drawings, making a part of this specification, and to the letters and figures of reference marked thereon.

Figure 1:
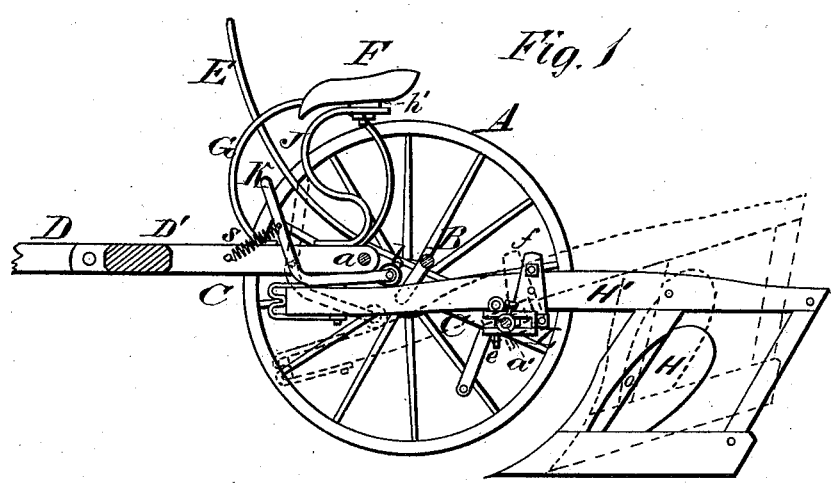
Figure 2:
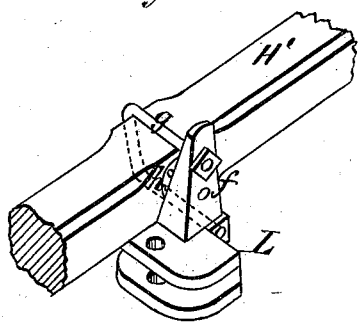
Figure 3:
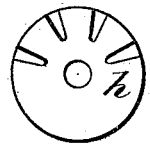
Figure 4:

Figure 1 of the drawings is a representation of a longitudinal vertical section of my frame applied to a plow; and Figs. 2, 3, and 4 are detail views thereof. Fig. 5 is a longitudinal vertical sectional view of my frame applied to a stalk-cutter, and Fig. 6 a perspective view of the same applied to a cultivator.

The main object of my invention is to adapt an adjustable two-wheel carriage or draft-frame to receive a plow, a corn-stalk chopper, or a harrow or cultivator, as may be required, thereby rendering unnecessary the use of a draft-carriage for each implement.

Another object of my invention is to provide for properly attaching a plow-beam to the draft-frame, starting the plow into the ground, and regulating the depth of running of the plow, whether the machine be controlled by a large or a small person, as will be hereinafter explained.

Another object of my invention is to provide for properly setting the driver's seat, and also the plow, according to the depth of furrow required, whereby the seat will be level, and the point of the plow and its land-side will be properly directed to the land, as will be hereinafter explained.

In the annexed drawings, A A designate two transporting-wheels, which turn on an arched or cranked axle, B, having adjustably secured to it a draft-frame, C. This frame C is composed of two longitudinal beams, which are connected together at their front and rear ends by round rods $a$ $a'$. The draft-pole D and its hounds D' D' are pivoted to the front cross-rod $a$, so that the rear end of the draft-frame can be raised or depressed by means of a hand-lever, E, arranged alongside of the driver's seat F. A toothed circle, G, which is secured on one of the hounds of the draft-pole, holds the frame C when it is properly adjusted. The lateral spring of lever E keeps it engaged in the notches of the segment or circle G. The S-shaped standard J of the driver's seat F is rigidly secured to the rear end of the draft-pole D, so that the seat is free to rise and descend with the front end of the frame C. The distance, and consequently the length, of leverage between the front rod $a$ of frame C and the axle B can be changed at will by loosening the clasps which confine the draft-frame upon its axle, and, after adjustment, tightening these clasps again. This adjustment adapts the machine for large or small persons sitting in the seat F.

Fig. 1 shows the machine arranged for plowing, H being a turn-plow secured by standards to a beam, H', having a draft-clevis attached to its front end. The beam H' extends over the rear rod $a'$ of frame C and beneath the arched axle B, and just in rear of the front rod $a$ of frame C is an anti-friction roller, $b$, which is applied to the rear end of a lever-treadle, K, pivoted to the draft-pole D. The roller $b$ is held up, as shown in Fig. 1, by means of a spring, $s$, and when the driver wishes to start the plow into the ground he presses back the front end of lever K, which inclines the plow, as shown in dotted lines, Fig. 1. The depth for running the plow is regulated by adjusting the hand-lever E. At or near the middle of the length of the beam H' is a horizontally-slotted clasp, L, which is designed to embrace the rear rod $a'$ of frame C, and be attached to it by a vertical removable pin, $e$. The standard $f$ of the clasp L is secured to the beam H' by means of a clip, $g$, which embraces the beam, and receives nuts on its ends. Between the beam H' and the standard $f$ of clasp L is a circular plate, $h$, which is tapered, as shown in Fig. 4, and centrally perforated to receive a screw-pivot by which to attach it to the standard $f$. By loosening nuts on the clip $g$ the plate $h$ can be turned by means of a lever inserted into one of three radial grooves in it, thus changing the plane of the land-side with respect to the plane or inclination of the draft-frame C. By these means the plow can be set to run as desired, whatever may be the lateral inclination of the draft-frame. A beveled plate, $h'$, constructed precisely like plate $h$, is applied between the seat F and the seat-standard J, for leveling the seat when one wheel runs on the unplowed land and the other runs in the furrow.

For chopping up stubble in the field, I use a drum, N, composed of radial cutting-blades 2, secured to circular heads 3. The gudgeons on the heads 3 have their bearings in arms $j$, which are rigidly secured to the side beams of the draft-frame C. The driver, by means of the lever E, presses down the drum with any desired degree of force, and the blades 2 perform the cutting as the machine is moved along.

In Fig. 6 I have represented an A-shaped harrow, having spiked teeth $k$ fixed to its inner diverging bars, and shovel or cultivator teeth fixed to its outer bars. Some distance in rear of the draft-clevis $m$ a clasp, $n$, of U shape is secured to the harrow, which clasp embraces the rear rod $a'$ of the draft-frame, and is attached by means of a pin, $p$. This allows the harrow to articulate freely, and accommodate itself to the undulations of the surface passed over.

If desired, the lever K may be so shaped and applied that the driver by a simple downward or forward pressure of his foot upon it can raise the plow for directing it into the ground. For the purpose of preventing lateral displacement of the clasp of either the plow or the harrow, such clasp has collars $y$ adjustably applied on opposite sides of it, which can be fixed rigidly to the rod $a'$ by means of set-screws. These collars do not interfere with a free vertical and lateral articulation of the implements.

What I claim as new, and desire to secure by Letters Patent, is—

1. The carriage-frame C, having the crooked axle B rigidly, but adjustably, secured to it, and having the draft-pole D pivoted to its front rod $a$, in combination with the lever E, its toothed segment G, the lever K, and its anti-friction roller $b$, substantially as described.

2. The combination of the clasp L, provided with the standard $f$, clip $g$, washer $h$, and collars $y$, with the rear rod $a'$ of the draft-frame C, substantially as described, and for the purpose set forth.

In testimony that I claim the above I have hereunto subscribed my name in the presence of two witnesses.

SAMUEL T. ADAMS.

Witnesses:
 JOHN F. ACKER, Jr.,
 D. D. KANE.